United States Patent [19]

Shiota

[11] Patent Number: 4,901,249
[45] Date of Patent: Feb. 13, 1990

[54] PRINTING APPARATUS WHICH CAN SPECIFY A FONT MEMORY IRRESPECTIVE OF A MOUNTING POSITION THEREOF, AND A METHOD OF SPECIFYING A FONT MEMORY

[75] Inventor: Keiichi Shiota, Tokyo, Japan

[73] Assignee: Kabushiki Kaisha Toshiba, Kawasaki, Japan

[21] Appl. No.: 842,219

[22] Filed: Mar. 21, 1986

[30] Foreign Application Priority Data

Mar. 30, 1985 [JP] Japan ................................ 60-67051

[51] Int. Cl.⁴ ...................... G06F 9/00; G06F 15/626
[52] U.S. Cl. .................................... 364/519; 364/518; 400/72
[58] Field of Search ............................... 364/518–523; 400/69, 70, 72, 73, 121, 124, 692

[56] References Cited

U.S. PATENT DOCUMENTS

| | | | |
|---|---|---|---|
| 3,964,591 | 6/1976 | Hill et al. .......................... | 400/72 X |
| 4,138,719 | 2/1979 | Swanstrom et al. ................ | 364/200 |
| 4,281,938 | 8/1981 | Phillips ............................... | 400/171 |
| 4,300,206 | 11/1981 | Belleson et al. ..................... | 364/900 |
| 4,435,769 | 3/1984 | Nagano et al. ...................... | 364/464 |
| 4,594,674 | 6/1986 | Boulia et al. ........................ | 364/523 |
| 4,608,664 | 8/1986 | Bartlett et al. ...................... | 364/900 |
| 4,675,833 | 6/1987 | Cheek et al. ........................ | 364/523 |
| 4,679,153 | 7/1987 | Robinson et al. ................... | 364/523 |

FOREIGN PATENT DOCUMENTS

| | | |
|---|---|---|
| 3244367 | 3/1971 | Fed. Rep. of Germany . |
| 3504937 | 3/1980 | Fed. Rep. of Germany . |
| 2015789 | 2/1970 | United Kingdom . |
| 2106677 | 11/1971 | United Kingdom . |

Primary Examiner—Gary V. Harkcom
Assistant Examiner—H. R. Herndon
Attorney, Agent, or Firm—Finnegan, Henderson, Farabow, Garrett and Dunner

[57] ABSTRACT

In a printing apparatus which can specify a font memory irrespective of its mounting position, signals supplied from an external apparatus are received by an interface section. A controller section checks whether the received signals are a font specifying command for specifying a font memory or are character data to be printed. When the received signals are character data, character pattern data corresponding thereto is generated using a font memory in pattern generation section corresponding to a font specifying number currently specified by the controller section, and is printed by a printer driver section. When the received signals are a font specifying command, the controller section temporarily stores a font name specified by the font specifying command and searches the specified font memory by sequentially referring the font memories in a pattern generator section to determine the font specifying number. However, when the specified font memory is not mounted, an alarm signal is generated from an alarm section.

13 Claims, 3 Drawing Sheets

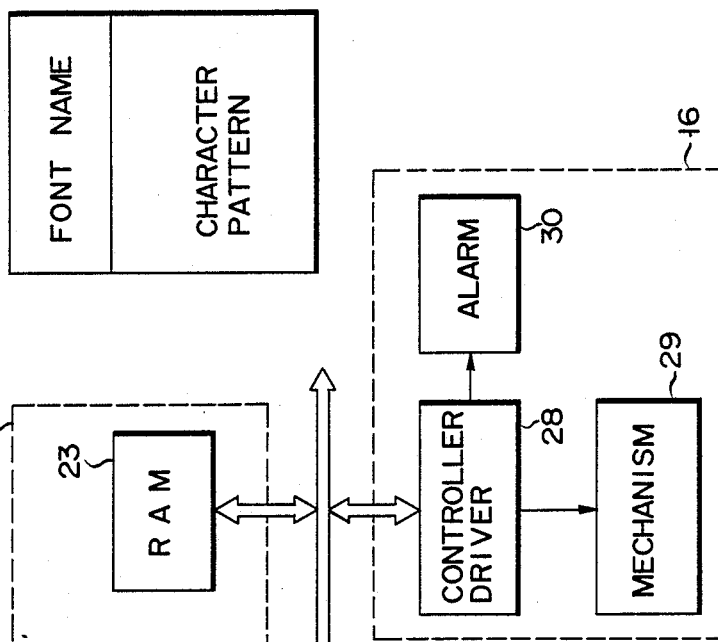
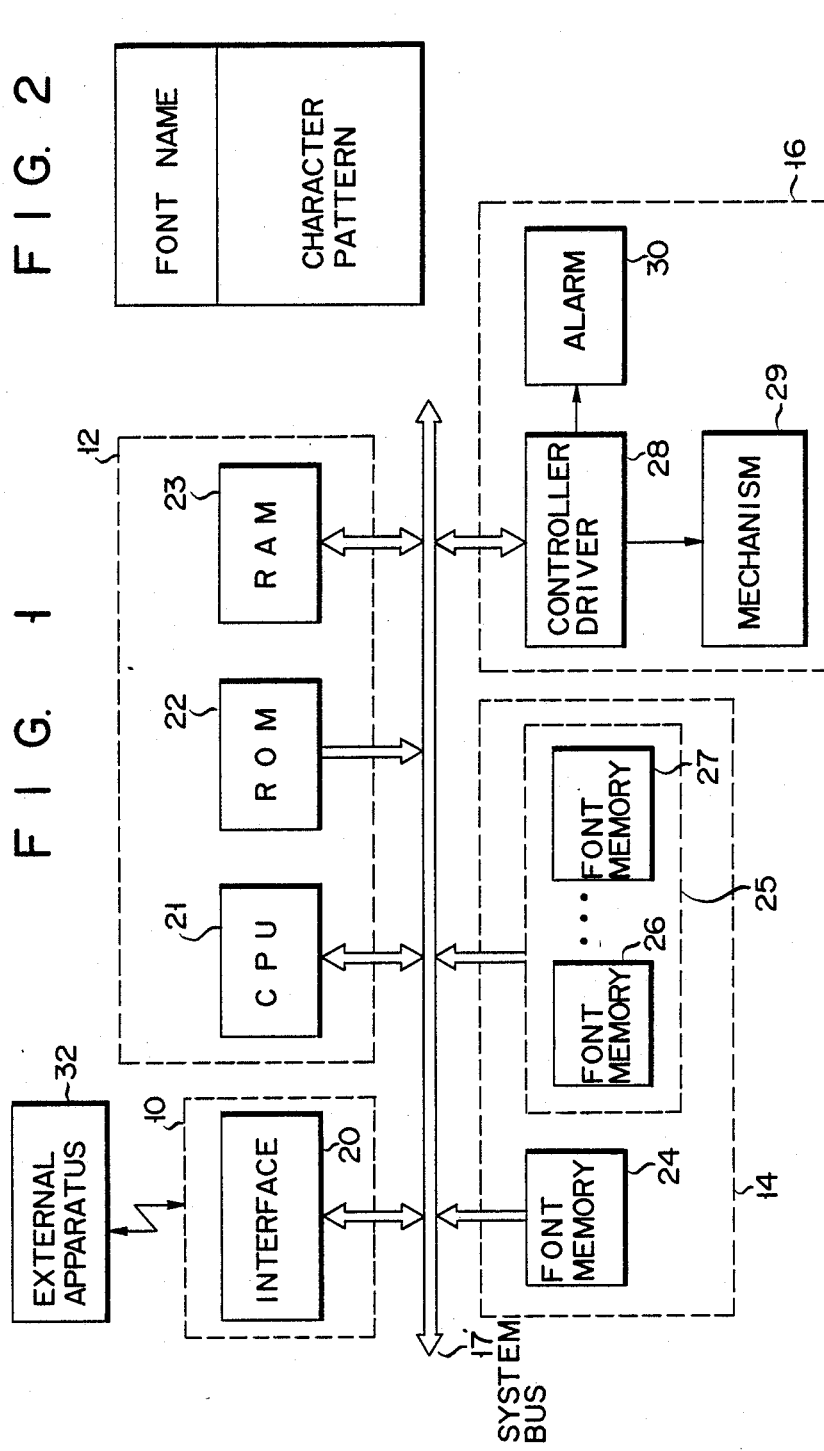

PRINTING APPARATUS WHICH CAN SPECIFY A FONT MEMORY IRRESPECTIVE OF A MOUNTING POSITION THEREOF, AND A METHOD OF SPECIFYING A FONT MEMORY

BACKGROUND OF THE INVENTION

The present invention relates to a printing apparatus which can print using a font memory specified from a plurality of font memories irrespective of mounting position, and a specifying method therefor.

Various conventional printing apparatuses can print single documents with several fonts (e.g., gothic, italic, etc.). Such printing apparatuses have a cartridge mounted thereon containing a plurality of font memories which store font data to effect the operation described above. Therefore, when font memories or cartridges are exchanged in accordance with a font to be printed, a document featuring various fonts can be produced.

In such a printing apparatus, each font memory is uniquely determined by a font specifying number corresponding to its physical mounting position in the cartridge. More specifically, a printing operation is carried out by a font memory corresponding to the font specifying number specified by a user in a program, and the printing apparatus itself has no determination means for specifying the font memory. For this reason, when a user selects a desired font (i.e., a desired font memory), a printing program must be modified to correspond to a given font specifying memory, or a mounting position of the font memory in the cartridge must be changed. Therefore, conventional apparatus are very inconvenient to use because erroneously selected fonts can only be found by checking the printed output.

SUMMARY OF THE INVENTION

The present invention has been made in consideration of the above situation, and has as its object to provide a printing apparatus which can select an appropriate font memory from a plurality of font memories irrespective of its mounting position in a cartridge and perform a printing operation using the selected font memory, and to provide a method of specifying a font memory.

In order to achieve the above object of the present invention, there is provided a printing apparatus which can specify a font memory irrespective of its mounting position, comprising: a character pattern memory means comprising at least one font memory storing character pattern data for generating character pattern data corresponding to input character code data using a specified font memory; a font memory specifying means for sequentially searching the font memories in said character pattern memory means to specify the font memory to be used in a printing operation in response to a font specifying instruction, an output means for outputting character code data to said character pattern memory means in response to a printing instruction; and printing means for printing the character pattern data from said character pattern memory means.

Furthermore, according to the present invention, there is provided a method of specifying a font memory irrespective of a mounting address, comprising: sequentially inquiring font memories to search the specified font memory, and determining the font number corresponding to the physical mounting position of the specified font memory; and performing a printing operation using a currently specified font memory.

According to the printing apparatus of the present invention as described above, if one font name is specified, the desired font memory can be specified from a plurality of font memories irrespective of its mounting position, and a desired printed output can be obtained. As a result, the work load of a user can be reduced, and a printing operation can certainly be performed using the specified font memory.

BRIEF DESCRIPTION OF THE DRAWINGS

FIG. 1 is a block diagram of a printing apparatus according to an embodiment of the present invention;

FIG. 2 is a view showing a storage content of a font memory in FIG. 1; and

FIGS. 3A to 3C are flow charts, in which FIG. 3A is a flow chart showing a general operation, FIG. 3B is a flow chart showing a printing operation, and FIG. 3C is a flow chart when a font memory is specified and alarm processing is executed.

DETAILED DESCRIPTION OF THE INVENTION

Figure 3A:
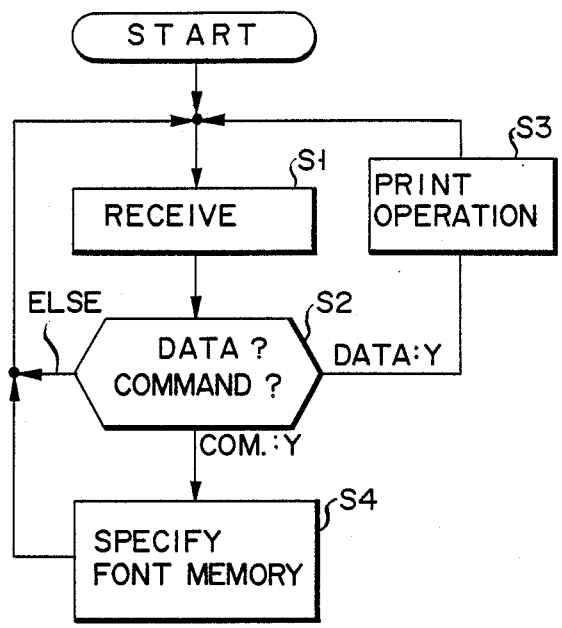

A printing apparatus according to an embodiment of the present invention will now be described with reference to the accompanying drawings. As shown in FIG. 1, the printing apparatus of the present invention comprises interface section 10, controller section 12, pattern generator section 14, and printer driver section 16. Interface section 10 comprises interface 20 connected to system bus 17, and receives a data signal, a command signal, and control signal from external apparatus (e.g., host computer) 32. In addition, section 10 outputs a control signal necessary for a signal-receiving operation to external apparatus 32. Furthermore, section 10 can include a circuit for generating a signal to apparatus 32. Pattern generator section 14 comprises at least one fixed font memory 24 and at least one detachable cartridge 25 consisting of at least one font memories 26 and/or 27, and is connected to system bus 17. Font memory 24 or 26 stores, for example, a gothic or italic font pattern.

Each font memory is constituted by a ROM, and a storage area thereof is divided into two areas, as shown in FIG. 2. One of the storage areas stores a font name of the ROM for identification, and the other stores character pattern data. In this embodiment, the font name is stored in the ROM itself, but can be stored in an external circuit of the ROM. When each font memory is accessed, it outputs the font name and the character pattern data corresponding to the input character code data. Printer driver section 16 is connected to system bus 17, and comprises controller driver 28, mechanism 29, and alarm 30. Controller driver 28 receives an input character pattern data and controls mechanism 29 to print the data, under the control of CPU 21. When CPU 21 detects some abnormality, alarm 30 generates an alarm under the control of controller driver 28. Controller section 12 comprises microprocessor (CPU) 21, ROM 22, and RAM 23, and CPU 21 controls the overall apparatus of this invention in accordance with a program written in ROM 22. RAM 23 stores data and information necessary for the printing operation.

Figure 3B:
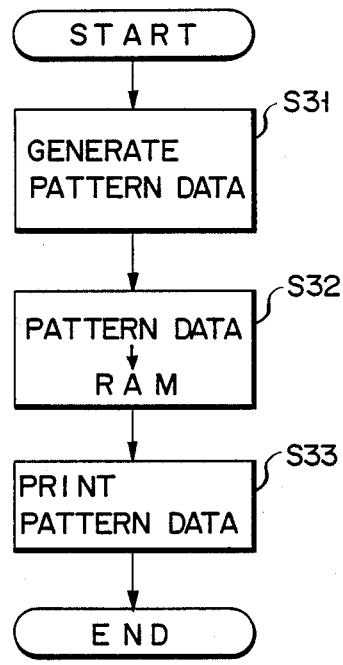
Figure 3C:
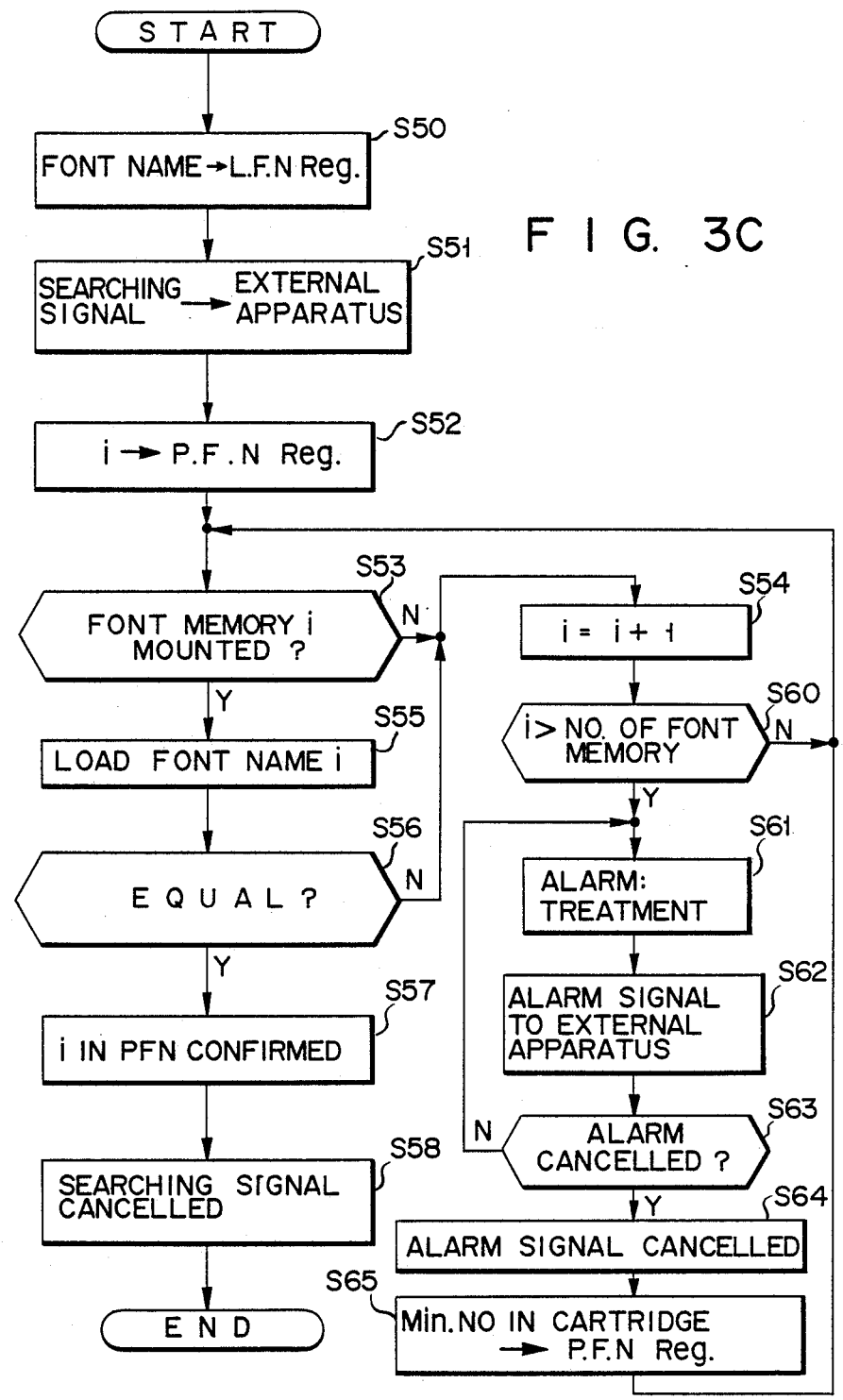

The operation of the printing apparatus of the present invention shown in FIG. 1 will now be described with reference to FIGS. 3A to 3C. The general operation will first be described with reference to FIG. 3A. Character code data and a font specifying command data for specifying the font memory which are input from external apparatus 32 (e.g., a host computer), are received by interface 20 under the control of CPU 21 (step S1). Interface 20 is controlled by CPU 21 in accordance with a normal communication technique so that data does not overflow RAM 23. CPU 21 checks whether the received data is a font specifying command or character code data (step S2). When the received data is the character code data, normal printing processing is executed (step S3). FIG. 3B shows the printing processing in detail. When the received data is the font specifying command, a font name specified by the input font specifying command is temporarily stored, and the font memories in section 14 are sequentially referred to specify the corresponding font name, i.e., the font memory (step S4). The flow then returns to step S1, and the apparatus awaits the next input data.

The printing operation will now be described with reference to FIG. 3B. Received printing data is supplied to a font memory (e.g., memory 24), which is currently specified by a PFN (physical font name) register in CPU 21 (step S31). The currently specified font memory generates character pattern data corresponding to the input character code data. The converted data is then stored in RAM 23 of section 12 (step S32) and is output to driver 28 under the control of CPU 21. Driver 28 drives mechanism 29 under the control of CPU 21 to cause it to print the character pattern data (step S33). In this way, the input character code data from external apparatus 32 is printed. In the above description, the character code data is output to the font memory immediately after it is supplied to interface 20. However, CPU 21 can perform control such that the input character code data from interface 20 is temporarily stored in RAM 23 and the stored data is then supplied to the font memory specified by the PFN register in the printing operation, so as to supply the converted character pattern data from the font memory to driver 28.

The operation for searching the font memory in accordance with the font specifying command will now be described with reference to FIG. 3C. When it is determined in step S2 that the data received by interface 20 is a font specifying command, the font name specified by the command is temporarily stored in an LFN (logical font name) register (step S50). The LFN register can be a register allocated in CPU 21 or RAM 23. CPU 21 supplies to external apparatus 32 through interface 20 signals indicating that CPU 21 is currently searching the specified font memory (step S51), so as to temporarily interrupt the receiving operation. Therefore, external apparatus 32 cannot transmit any data, including character code data. CPU 21 then sets a minimum of font numbers i corresponding to physical mounting positions of font memories in section 14 of the PFN register (step S52). Next, CPU 21 checks if a font memory corresponding to font number i is mounted (step S53). In this case, all the output terminals constituting the font memories must be connected to a power source voltage through a pull up resistor to be pulled up. A given address of the font memory is accessed and it is checked if the data read out therefrom is "FF" in hexadecimal notation. When the data is "FF", it is determined that the specified font memory is not mounted. More specifically, when the specified font memory is not mounted, since the output terminals of the memory are pulled up, "FF" is read out as if it is stored in the memory when the given address is accessed. Therefore, it can be determined that the specified font memory is not mounted. It should be noted that no "FF" data must be stored at the given address on the font memory. Thus, if N (NO) in step S53, font number i in the PFN register is incremented by one (step S54), and the flow returns to step S53. However, if Y in step S53, CPU 21 accesses the font memory corresponding to font number i, and loads the font name thereof (step S55). CPU 21 then checks if the loaded font name coincides with that in the LFN register (step S56). When Y in step S56, font number i of the PFN register (i.e., the specified font memory) is determined (step S57). When the font memory is determined, CPU 21 supplies to external apparatus 32 through interface 20 signals indicating that searching of the font memory is completed (step S58). Thereafter, CPU 21 awaits the next input (normally, character code data) from external apparatus 32. When no coincidence is found between the loaded font name and the font name in the LFN register, font number i of the PFN register is again incremented by one (step S54) and the flow returns to step S53. The above operation is repeated in this manner, and the specified font memory is searched. In this case, CPU 21 first searches fixed font ROM 14, and then searches the font memories in the loaded cartridge.

After font number i in the PFN register is incremented by one in step S54, CPU 21 checks in step S60 if number i exceeds a maximum physical font number (i.e., a maximum of numbers corresponding to physical mounting positions of font memories). If N in step S60, step S53 is executed again, and the searching operation is continued. However, when Y in step S60, i.e., when the number i exceeds the maximum number, alarm processing is executed (step S61). In step S61, controller driver 28 drives alarm 30 under the control of CPU 21 to signal, by means of one or both of an LED and a buzzer, that the specified font memory is not mounted. This control loop is repeated until the cause of the alarm is removed. At the same time, CPU 21 can supply to external apparatus 32 through interface 20 signals indicating that the specified font memory is not mounted (step S62). The alarm processing is continued until an appropriate cartridge is mounted. When this is accomplished, the alarm processing is cancelled (step S63). More specifically, the LED and the buzzer are disabled, and no alarm signal is supplied to apparatus 32 (step S64). Next, the minimum font specifying number of the font memories in the cartridge is loaded in the PFN register (step S65), and step S53 is executed.

In the apparatus of the present invention, when a power source is turned on, default processing can be performed. In default processing, a font number corresponding to a pre-specified font memory (e.g., a minimum of font numbers corresponding to the fixed font memories) is loaded in the PFN register. In this apparatus, transmission of the font specifying command can be requested from external apparatus 32 at the same time the power source is turned on.

In this way, processing for searching a font name specified by the external apparatus is executed with respect to the font memories with preset font names. Thereby, a printing operation can be executed based on the font memory with the specified font name. Since the font memories can be accessed irrespective of their mounting positions, their positions in a cartridge need not be changed. In addition, a printing program need not be modified to correspond with a font specifying number of a given font memory in a cartridge, thus preventing the font memory from being erroneously specified. Furthermore, since the alarm processing can be executed, a user can detect a non-mounted state of the specified font memory before the printing operation begins. For this reason, the specified font memory can be effectively chosen or changed, as needed.

What is claimed is:

1. A printing apparatus comprising:
   means for receiving externally generated signals including input character code data, a font-specifying instruction, and a printing instruction;
   character pattern memory means for generating character pattern data corresponding to said input character code data, including:
   a plurality of font memories each of the font memories storing character pattern data and an identifying font name,
   means for generating and corresponding character pattern data in accordance with said font memory,
   means for detachably mounting a plurality of font memories;
   a fixed font memory including one of the plurality of font memories, and
   a detachable cartridge including one of the plurality of font memories;
   font memory specifying means for sequentially searching each font memory of said character pattern memory means for the font memory to be used in a printing operation in accordance with said font-specifying instruction;
   output means for outputting character code data to said character pattern memory means in response to said printing instruction; and
   printing means for printing the character pattern data from said character pattern memory means.

2. The apparatus according to claim 1, wherein said each font memory in said character pattern memory means comprises a read only memory, the storage area thereof being divided into two areas, one area storing the character pattern data, and the other storing the font name.

3. The apparatus according to claim 1, wherein said font memory specifying means comprises:
   first storage means for temporarily storing the font name specified by the font specifying instruction;
   second storage means for storing during printing operation a minimum font number of the font members corresponding to physical mounting positions of the font memories in said character pattern memory means;
   first determination means for determining that a font memory corresponding to the font number stored in said second storage means is detachably mounted;
   means for incrementing the font number stored in said second storage means by one to enable said first determination means at times when said first determination means determines that the font memory is not detachably mounted;
   second determination means for reading out the font name from the specified font memory to said second storage means, and for checking if the read out font name coincides with the font name stored in said first storage means, when said first determination means determines that the font memory is detachably mounted;
   means for incrementing the font number stored in said second storage means by one to enable said first determination means at times when said second determination means determines that no coincidence is detected between the font names; and
   means for specifying a font memory to be used in the printing operation based on the font number stored in said second storage means at times when said second determination means determines that a coincidence is detected between the font names.

4. The apparatus according to claim 3, wherein said first determination means includes a means for checking if the specified font memory is mounted depending on the response of said character pattern memory means when said character pattern memory means is accessed based on the font specifying number.

5. The apparatus according to claim 3, wherein said font memory specifying means further comprises means for generating a search signal indicating that the specified font memory is being searched in response to the font specifying instruction, and for cancelling generation of the search signal when the searching operation is completed, and the apparatus further comprises interface means for inhibiting data input from an external apparatus in response to the search signal supplied from said font memory specifying means.

6. The apparatus according to claim 3, wherein said font memory specifying means further includes generation means for generating an alarm indicating that the specified font memory is not mounted when the specified font memory cannot be found after font memories are checked up to a maximum font number of numbers corresponding to physical mounting positions thereof; and
   alarm means for signaling an external apparatus in response to the alarm generated from said generation means.

7. The apparatus according to claim 6, which further comprises means for supplying, to said external apparatus in response to the alarm, signals indicating that the specified font memory is not mounted.

8. The apparatus according to claim 6, wherein said alarm means comprises an LED.

9. The apparatus according to claim 6, wherein said alarm means comprises a buzzer.

10. A method of specifying a font memory having a corresponding specified font name without having a mounting address for the specified font memory, comprising:
    detachably mounting at least one font memory in a character pattern memory means;
    sequentially inquiring of each detachably mounted font memory to search for the specified font memory, and to determine the font number corresponding to the physical mounting position of the specified font memory, including the substeps of
    loading a minimum font number corresponding to a physical mounting position of a font memory as a font specifying number;
    first checking if the font memory corresponding to the loaded font specifying number is mounted;
    incrementing the loaded font specifying number by one and repeating the first checking substep when the specified font memory is not mounted;
    accessing the font memory corresponding to the font specifying number and loading a font name therefrom when the specified font memory is mounted;
    checking if the loaded font name coincides with the specified font name;

incrementing the loaded font specifying number by one and repeating the substeps of first checking if the font memory corresponding to the loaded font specifying number is mounted when no coincidence is found between the loaded font name and the specified font name; and determining the font specifying number corresponding to the specified font and completing the sequentially inquiring step when a coincidence is found between the loaded font name and the specified font name; and performing a printing operation to print out character patterns in accordance with the font memory specified by the corresponding font number.

11. The method according to claim 10, wherein storing the font name during a printing operation further includes outputting to an external apparatus a search signal indicating that a searching operation is being performed in response to the font specifying instruction; and inquiring the font memories further includes cancelling the search signal when the searching operation is completed.

12. The method according to claim 10, wherein the first checking step further comprises outputting an alarm indicating that the specified memory is not mounted when the specified memory is not found after font memories are checked up to a maximum font number of numbers corresponding to the physical mounting positions thereof.

13. The method according to claim 12, wherein the alarm step further includes the step of outputting, to said external apparatus in response to the alarm, a signal indicating that the specified font memory is not mounted.

* * * * *

UNITED STATES PATENT AND TRADEMARK OFFICE
CERTIFICATE OF CORRECTION

PATENT NO. : 4,901,249
DATED : February 13, 1990
INVENTOR(S) : Keiichi Shiota

It is certified that error appears in the above-identified patent and that said Letters Patent is hereby corrected as shown below:

<u>In the Claims</u>

Claim 3, Column 5, Line 45, change "during" to --during a--;

Claim 3, Column 5, Line 46, change "mem-" to --num- --.

Signed and Sealed this

Second Day of June, 1992

Attest:

DOUGLAS B. COMER

*Attesting Officer*   Acting Commissioner of Patents and Trademarks